(12) United States Patent
Bredesen et al.

(10) Patent No.: US 8,163,064 B2
(45) Date of Patent: Apr. 24, 2012

(54) LEAK-PROOF MEMBRANE ELEMENT AND METHOD OF MANUFACTURING SUCH AN ELEMENT

(75) Inventors: Rune Bredesen, Oslo (NO); Dag Slotfeldt-Ellingsen, Oslo (NO); Hallgeir Klette, Oslo (NO)

(73) Assignee: Sinvent AS, Trondheim (NO)

( * ) Notice: Subject to any disclaimer, the term of this patent is extended or adjusted under 35 U.S.C. 154(b) by 394 days.

(21) Appl. No.: 12/311,314

(22) PCT Filed: Sep. 28, 2007

(86) PCT No.: PCT/NO2007/000344
§ 371 (c)(1),
(2), (4) Date: Oct. 15, 2009

(87) PCT Pub. No.: WO2008/039080
PCT Pub. Date: Apr. 3, 2008

(65) Prior Publication Data
US 2010/0028703 A1    Feb. 4, 2010

Related U.S. Application Data

(60) Provisional application No. 60/847,914, filed on Sep. 29, 2006.

(51) Int. Cl.
*B01D 53/22*   (2006.01)
(52) U.S. Cl. ............... 95/45; 95/43; 95/55; 96/4; 96/10
(58) Field of Classification Search ............... 95/43, 45, 95/55; 96/4, 10
See application file for complete search history.

(56) References Cited

U.S. PATENT DOCUMENTS

| 5,217,506 A | 6/1993 | Edlund et al. |
| 5,782,960 A * | 7/1998 | Ogawa et al. ............... 96/11 |
| 5,997,594 A | 12/1999 | Edlund et al. |
| 6,086,729 A | 7/2000 | Bredesen et al. |

(Continued)

FOREIGN PATENT DOCUMENTS

EP    1 184 125    3/2002

(Continued)

OTHER PUBLICATIONS

Totsi S. et al., "Diffusion Bonding of Pd-Ag Rolled Membranes", Journal of Materials Science 39, 2004, pp. 3041-3046.

(Continued)

*Primary Examiner* — Jason M Greene
*Assistant Examiner* — Anthony Shumate
(74) *Attorney, Agent, or Firm* — Wenderoth, Lind & Ponack, L.L.P.

(57) ABSTRACT

A leak-proof membrane element (1) for the selective separation or cleaning of gas, wherein a metal foil (membrane) (3) is deposited onto a supporting stock (substrate) (2, 20) having connection means (4, 21, 34) on the ends/edges of the substrate allowing the membrane element to be installed in a housing. A metal foil (3), having a thickness of less that 10 micrometers and being selectively permeable for specific gases, is arranged in flakes or wound with overlapping joints (8) on the outside of the substrate (2, 20), any joints being welded together by diffusion bonding so that the foil forms a continuous, leak-proof metal membrane layer. The substrate being made of a material (metal, ceram, polymer, or combinations thereof) exhibiting a very high gas flux for the gas(es) that the membrane is to let through.

25 Claims, 9 Drawing Sheets

U.S. PATENT DOCUMENTS

| | | | |
|---|---|---|---|
| 6,221,117 B1 | 4/2001 | Edlund et al. | |
| 6,537,352 B2 | 3/2003 | Edlund et al. | |
| 6,632,270 B2 | 10/2003 | Edlund et al. | |
| 6,666,909 B1 * | 12/2003 | TeGrotenhuis et al. | 95/273 |
| 6,719,831 B2 | 4/2004 | Edlund et al. | |
| 6,723,156 B2 | 4/2004 | Edlund et al. | |
| 6,783,741 B2 | 8/2004 | Edlund et al. | |
| 6,824,593 B2 | 11/2004 | Edlund et al. | |
| 7,052,530 B2 | 5/2006 | Edlund et al. | |
| 7,195,663 B2 | 3/2007 | Edlund et al. | |
| 7,297,183 B2 * | 11/2007 | Edlund et al. | 96/4 |
| 7,749,305 B1 * | 7/2010 | Bossard et al. | 95/55 |
| 7,972,420 B2 * | 7/2011 | Pledger et al. | 96/4 |
| 8,030,600 B2 * | 10/2011 | Kimura | 219/615 |
| 2002/0070158 A1 | 6/2002 | Buecher et al. | |
| 2002/0083829 A1 | 7/2002 | Edlund et al. | |
| 2003/0015096 A1 * | 1/2003 | Sato et al. | 96/4 |
| 2003/0159354 A1 | 8/2003 | Edlund et al. | |
| 2003/0164094 A1 | 9/2003 | Edlund et al. | |
| 2003/0205138 A1 | 11/2003 | Edlund et al. | |
| 2003/0213364 A1 | 11/2003 | Edlund et al. | |
| 2004/0083890 A1 | 5/2004 | Edlund et al. | |
| 2005/0188843 A1 | 9/2005 | Edlund et al. | |
| 2006/0213369 A1 | 9/2006 | Edlund et al. | |
| 2007/0251387 A1 | 11/2007 | Edlund et al. | |

FOREIGN PATENT DOCUMENTS

| | | |
|---|---|---|
| EP | 1 679 111 | 7/2006 |
| FR | 2 858 776 | 2/2005 |
| JP | 7-51552 | 2/1995 |
| NO | 304220 | 11/1998 |
| NO | 323046 | 12/2006 |

OTHER PUBLICATIONS

Klette H., Bredesen R., "Sputtering of Very Thin Pd-Alloy Hydrogen Separation Membranes", Society of Vacuum Coaters, 505/856-7188, 2004, pp. 1-5.

International Search Report mailed Jan. 28, 2008 for International Application No. PCT/NO2007/000344.

S. Tosh et al., "Characterization of thin wall Pd-Ag rolled membranes", International Journal of Hydrogen Energy 28, (2003), pp. 105-112.

Shin-Kun Ryi et al., "A new membrane module design with disc geometry for the separation of hydrogen using Pd alloy membranes", Journal of Membrane Science 297, (2007), pp. 217-225.

Shigeyuki Uemiya, "State-of-the-Art of Supported Metal Membranes for Gas Separation", Separation and Purification Methods, 28 (1), 51-85 (1999).

S. N. Paglieri and J. D. Way, "Innovations In Palladum Membrane Research", Separation and Purification Methods, 31 (1), 1-169 (2002).

* cited by examiner

LEAK-PROOF MEMBRANE ELEMENT AND METHOD OF MANUFACTURING SUCH AN ELEMENT

This application claims priority to U.S. Provisional Application Ser. No. 60/847,914, filed Sep. 29, 2006. This application has priority to PCT/NO2007/000344

The present invention relates to the separation or cleaning of gases by means of very thin metal membranes being selectively permeable for specific gases.

More particularly, the invention relates to a leak-proof membrane element for the selective separation or cleaning of gas. The membrane element is comprised by a metal foil (membrane) deposited onto a supporting substrate of metal, ceram, polymer, or combinations thereof, and connection means allowing the element to be installed in a housing. The substrate must be penetrable for the gas(es) that is/are to pass through the membrane, and may be either a porous material or a material that is penetrable for the desired gases by solid phase diffusion (e.g. mixed conductors of electronic and oxygen ion conducting and/or proton conducting cerams or metals of the IVB and VB groups) or layered combinations thereof. When the installation of the membrane element inside a housing has been completed, individual gas flows on each side of the membrane element shall remain separate (hence the term leak-proof), except from the gas(es) that the membrane selectively lets through from the one side of the membrane to the other.

The invention also relates to a method for providing a leak-proof membrane element as described above.

Many metals have the property of being selectively permeable for specific gases. For example, by passing a gas mixture on the one side of a metal pipe possessing such a selective gas flux, it will be possible to pump the gas(es) diffusing through the metal pipe out to the other side of the pipe. This principle is currently being exploited for the separation and cleaning of hydrogen gas, for example, thorough the use of palladium alloy pipes. In this case, the wall thickness of such palladium pipes is typically in the order of 100 micrometers. The amount of hydrogen passing through the membrane per unit of time (the hydrogen flow) is inversely proportional to the pipe wall thickness and proportional to the pipe surface area. However, in the cleaning or separation of large amounts of hydrogen in membrane installations using such palladium pipes, the associated costs are high as the hydrogen flow is relatively slow due to the relatively large membrane thickness, and as palladium is a very expensive metal. By reducing the thickness of the palladium membrane, however, the hydrogen flux (hydrogen flow per unit area) may be increased and the costs reduced. This is essential in many applications e.g. in the separation of hydrogen in connection with the removal of $CO_2$ in large energy production installations or in connection with the production of hydrogen to a filling station for hydrogen fuelled vehicles. In such cases, a membrane thickness in the order of 1 micrometer is preferable. Today, as there is a limit to how thin yet sufficiently stable in shape metal pipes can be produced, thin metal membranes are formed primarily by depositing a metal coating onto a porous metal, ceram, or polymer supporting substrate (pipe, sheet, m). It is advantageous if the gas permeability of the substrate (e.g. resulting from through pores of sufficient size or a great ability to diffuse solid phase gas) is so high that the hydrogen flux is not limited by the permeability of the substrate. The metal membrane may be deposited onto the supporting substrate using various well-known methods, such as is physical deposition (sputtering) and chemical deposition (plating), for example. When this type of coating is applied to porous substrates, it has shown to be necessary that the metal coating has a certain minimum thickness (typically 5-10 micrometers) in order to achieve leak-proof membranes. An overview of the prior art technology as to the properties, manufacture, and use of palladium membranes is provided, inter alia, by S. Uemiya in Sep. Putif. Methods 28 (1999) 51-85, and by S. N. Paglieri and J. D. Way in "Innovations in Palladium Membrane Research" in Separation and Purification Methods, 31(1), 1-169 (2002), Marcel Dekker, Inc. Similar coating methods as those described in the above references are used for other metals and alloys.

At elevated temperatures, a metal substrate and metal membrane may react with each other chemically to degrade or ruin the functional properties of the membrane and/or substrate. Such chemical reactions may be prevented or alleviated by the use of a barrier layer of a gas penetrable (preferably porous), non-metallic material. Such intermediate layers may also be used for achieving a better contact between the metal membrane and substrate in cases for which this is required. Such layers may be manufactured using various methods, as set out in the U.S. Pat. No. 5,217,506, for example.

In some cases, the metal membrane may become degraded by the physical and/or chemical influence from the gas flow. This also may be prevented or alleviated by adding a thin protective layer on the outer side of the metal membrane, being made of a material having a high permeability for the gas to be separated/cleaned. Such layers may be manufactured using well-known physical or chemical methods as set out in the above references, for example.

A more specialized method for forming very thin, non-porous metal foils and metal membranes (typically with a thickness of 1-5 micrometers) is described the Norwegian Patent No. 304220/U.S. Pat. No. 6,086,729. The present invention is based on these latter publications, as using the metal foils disclosed therein. In order to be able to manufacture membrane elements having a large surface area from such thin metal foils, bands or flakes of the foils must be placed next to each other onto the substrate—strip-by-strip or flake-by-flake, and with close, overlapping joints.

This may be achieved in several ways: In the case of tubular substrates, a metal foil in the form of lengthy bands may be wound around the substrate pipe. Winding is a well-known method being used in various connections. What is essential for this application of a wound metal coating, however, is the ability to weld the joints together so as to achieve a continuous and leak-proof coating. The successful welding of metal foils typically requires that the foils are placed on an even or plane base, as well as the use of specialized welding apparatus and processes, as described in EP A1 1184125, for example, in which a palladium foil having a thickness of 35-50 micrometers was bent around a tubular substrate and welded together (with overlapping ends) using a special apparatus exploiting the well-known physical phenomenon known as diffusion bonding. In the present invention, however, the metal foils being used are so thin that diffusion bonding may be successively achieved without the use of any specialized welding apparatus.

In the case of sheet substrates, the metal foil must be disposed in strips or flakes in a similar manner, and with overlapping joints, onto the substrate. In this case also it will be critical to obtain leak-proof joints between overlapping strips or flakes of metal foil. As for a tubular substrate, according to the present invention, this may be accomplished by diffusion bonding without the use of any specialized mechanical welding apparatus.

The present invention also discloses how the likelihood of leaks due to faults in the metal foil or in the welding of the metal foil joints may be reduced dramatically by the use of two or more extremely thin metal foil layers added outside of each other in such a manner that the joints of one layer are not co-located with those of the layer underneath or above. This is true whether the substrate is tubular or flat.

The present invention also discloses an alternative method of forming a thin, protective barrier layer between the metal membrane and substrate and/or a thin, protective surface layer on the side of the metal membrane facing the incoming gas flow. In the method, such layers are deposited at the metal foil before the foil is wound or applied onto the substrate. Well-known coating methods such as the one described in the above references may be used for coating the metal foil.

When membrane elements as described above are to be installed in a housing, it is necessary to use a connection means which is also able to prevent the migration of undesirable gases from the one side of the membrane to the other. Various commonly used, and in some cases patented, solutions already exist for this purpose, which are based on the use of gaskets of different type and shape between the substrate, including the metal membrane, and the connector device. Such gaskets are made of various materials (rubber, graphite, etc.) depending on the temperature and chemical conditions to which the membrane element is exposed. Also, various different solutions are known for retaining such gaskets in place as well in compression, so that they maintain an adequate seal. In the present invention, it is shown how the above issues may be solved in a particularly simple manner because the metal membrane itself may be used as a gasket. If necessary, more than one layer of the metal membrane are used as a gasket.

The present invention is based on the above referenced patents: Norwegian Patent No. 304220/U.S. Pat. No. 6,086,729. One object of the present invention is to provide a leak-proof membrane element for the separation or cleaning of gas for cases in which membranes having, in particular, high flux for selected gases, low associated material cost, and that may be assembled to large processing plants, are needed.

Another object is to provide a particularly simple method of manufacturing a leak-proof membrane element as set out above.

The objects of the present invention are achieved by means of a leak-proof membrane element for the selective separation or cleaning of gas, wherein a metal foil (membrane) is disposed on a supporting stock (substrate), having a connection means on the ends/edges of the substrate allowing the membrane element to be installed in a housing, characterized in that a metal foil, having a thickness of less than 10 micrometers and being selectively permeable for specific gases, is arranged in flakes or wound with overlapping joints on the outside of the substrate, the optional joints being welded together by diffusion bonding so that the foil forms a continuous, leak-proof metal membrane layer, the substrate being made of a material (metal, ceram, polymer, or combinations thereof) having a very high gas flux for the gas(es) that the membrane is to let through.

Preferred embodiments of the leak-proof membrane element are detailed in claims 2 to 15, inclusive.

The feature distinguishing the invention from other, prior art technologies having a similar design is that the metal coating is so thin that particularly simple methods may be used for its application, for joining the joints thereof, and for sealing at pipe ends as well as against even base surfaces.

Further, the objects of the present invention are achieved by a method for providing a leak-proof membrane element for the selective separation or cleaning of gas wherein a metal foil (membrane) having a thickness of less than 10 micrometers, or such a metal foil covered on one or both sides thereof with other materials (barrier/protective layer), and being selectively permeable for specific gases, is deposited onto a supporting stock (substrate) exhibiting a high gas flux and being made of metal, ceram, polymer, or combinations thereof, and wherein a connection means is provided on the ends/edges of the substrate allowing the membrane element to be installed in a housing, characterized in that the method includes:

a) winding or depositing with overlapping joints (8) bands or flakes of the foil (pure metal foil or metal foil partially coated with a barrier/protective coating) on top of/on the outside of the substrate, b) then sealing the ends/edges of the substrate by fitting connection means onto the substrate with the membrane, with a sealant material being added between the substrate and the connection means that does not let through undesired gases, c) then welding the metal foil together to a continuous, non-porous membrane layer by diffusion bonding, d) inspecting the membrane element using a device (FIG. 3b) detecting any leaks in the membrane, and optionally repairing the membrane element.

Preferred embodiments of the method for providing the leak-proof membrane element is detailed in claims 17 to 24, inclusive.

A more detailed description of the invention is given below by way of typical examples:

BRIEF DESCRIPTION OF THE DRAWINGS

FIG. 2b shows the principle of a final stage of the winding process of FIG. 2a.

EXAMPLE 1

Tubular Membrane Element, with Reference to the Following Principle Drawings

Figure 1:
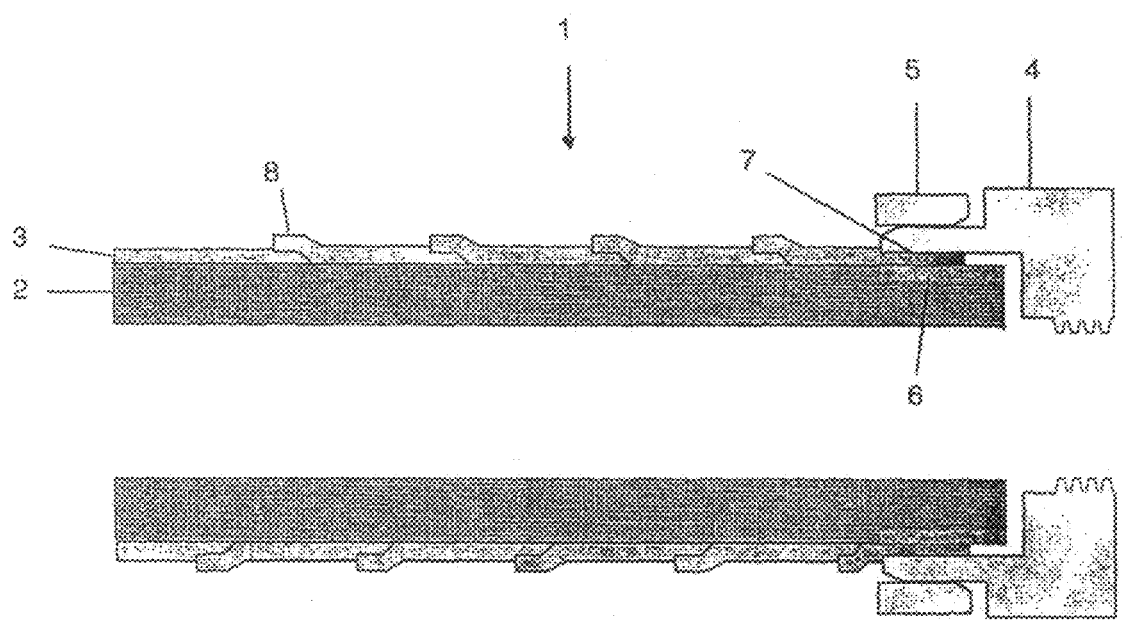
FIG. 1 shows a principle drawing of the implementation of a tubular membrane element according to the present invention. The figure shows one half of the element in a longitudinal view.

Referring to FIG. 1, in the present example a membrane element 1 including a supporting material in the form of a porous pipe (substrate) 2 made of metal, ceram, polymer, or combinations thereof is shown. The membrane element further includes a thin metal coating 3 (having a thickness in the order of 1 micrometer) made of a palladium alloy, for example (the membrane itself is selectively permeable for gas—namely hydrogen in this example) and end pieces 4 allowing several pipes to be connected in parallel in a larger gas separation assembly with supply and discharge lines, etc. The end pieces 4 are pressed against the pipe by a clamping ring 5. In a zone 6 at each end of the substrate pipe in which the end pieces is to be fit, the outer surface of the pipe has been machined so that its surface is smooth and the pipe has a perfect circular cross-section. In this example, metal coating 3 are used as a gasket 7 for sealing between pipe 2 and end pieces 4. Also, in this example, metal coating 3 is applied onto substrate 2 by winding a metal band 3 around substrate pipe 2—with overlapping joints 8 between the band strips. The joints are welded together by diffusion bonding.

Figure 2A:
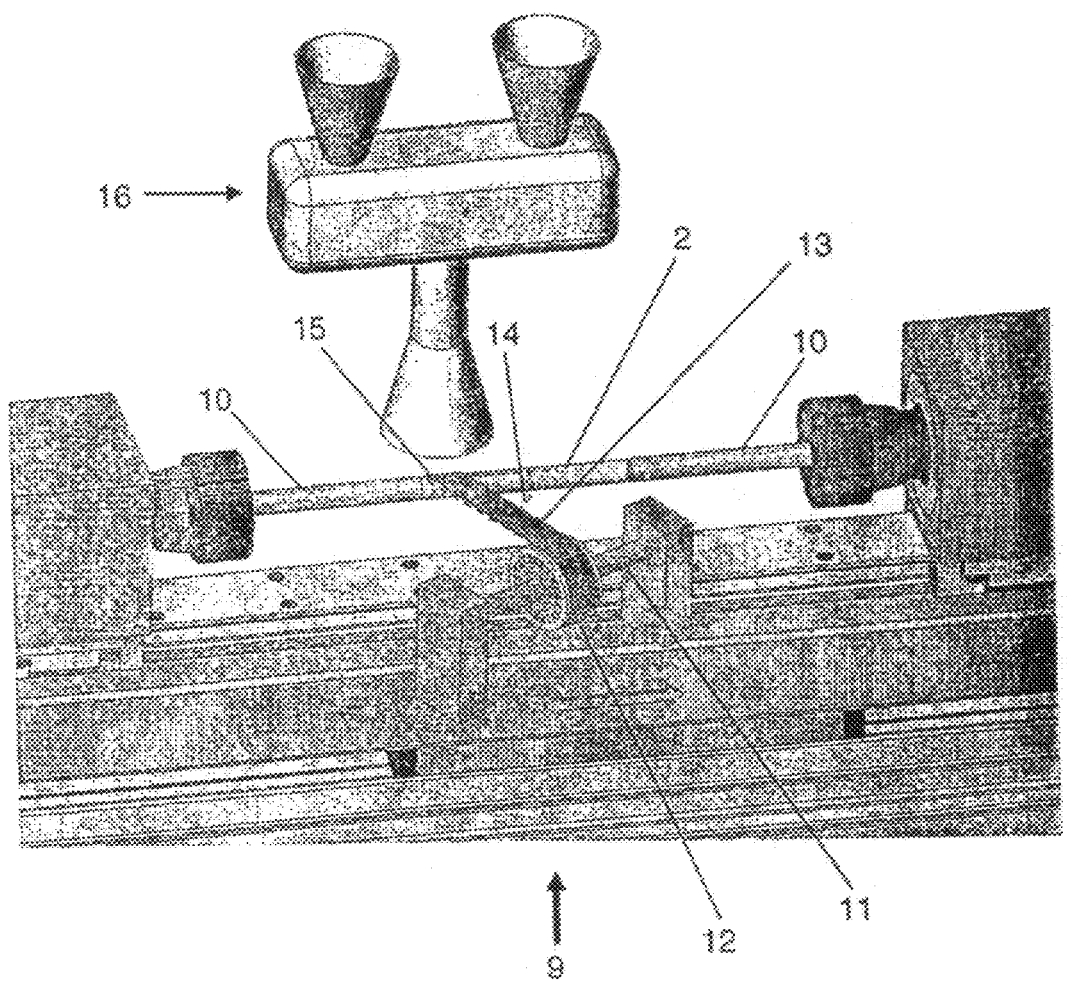
FIG. 2a shows the principle of a first stage of a method according to the invention for winding a thin metal band onto a tubular substrate.

In the present example, the membrane element as described above is manufactured by means of an assembly and test bench. Referring to FIG. 2a, the bench 9 is arranged so that a substrate pipe 2 may be fastened in the bench by means of a clamping device 10 with the longitudinal axis of the pipe in a horizontal orientation. The bench is further provided with two servo motors being capable of moving the substrate pipe in its longitudinal direction while the pipe is simultaneously being rotated about its longitudinal axis. The two separate movements may be synchronized with each other and the movement velocities may be varied. The bench further comprises a shaft 11 having a holder for a reel 12 containing a roll of a thin metal band (the metal membrane) 13. The reel forms an angle 14 relative to the longitudinal direction of the substrate pipe.

The first step of the manufacturing process is clamping a pre-adapted substrate pipe of the desired dimensions, materials, and properties in the assembly bench. Over a length of a few centimeters at each end of the substrate pipe—where the pipe end pieces are to be fit (see herein below)—the pipe surface needs to be smooth, the pipe diameter must be well-defined, and the pipe cross-section must be circular. Such pipes are well-known and widely commercially available, and are hence not a part of the present invention. In this example, a porous, stainless steel substrate pipe has been used.

The next step of the manufacturing process is setting a reel 12 containing a roll of metal band 13 in place in the assembly bench. Such rolls of very thin metal band are previously known (see the above referenced patents), and are hence not a part of the present invention. In the present example, metal bands having a thickness in the range of 1-5 micrometers of a palladium alloy has been used. The process of windingly apply the thin metal band 13 is initiated by pulling out and fixing the metal band to the one end of pipe 15. As the substrate pipe end has been polished, the thin metal foil sticks to the surface thereof without further action, ensuring a good adhesion.

Figure 2B:
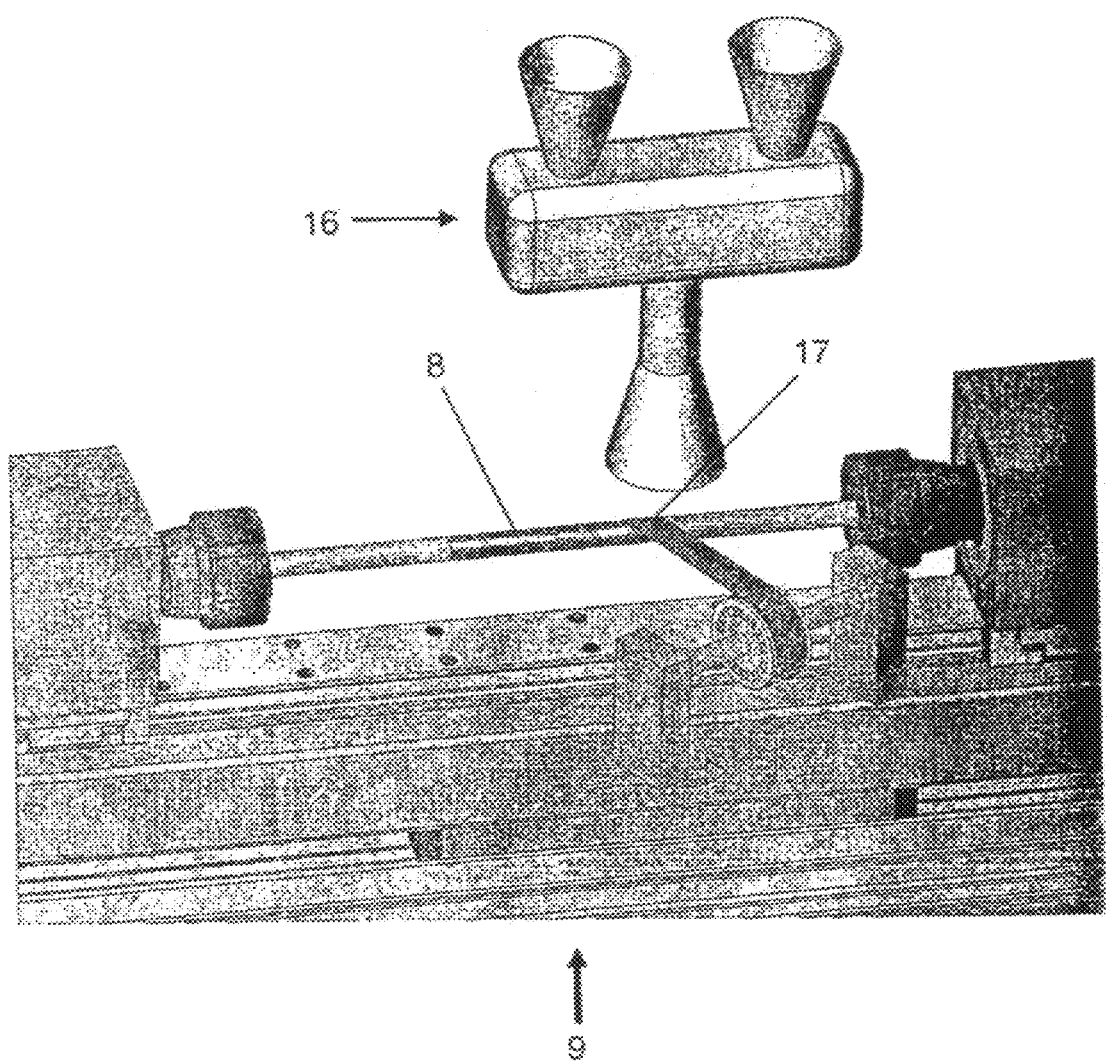

The winding process is initiated in that the rotary and linear motion of the pipe is started and runs synchronously so that the band is wound uniformly onto the pipe. The angle 14 between the metal band and the substrate pipe is adjusted so that a certain overlap 8 is formed—namely 5 millimeters in this example (see FIG. 2b). During this process, the reel movement is restrained so as to press the band against the base pipe. This stretch of the band is also necessary in order to achieve an adequate overlap. A microscope including a video camera 16 is positioned directly above the location at which the band is applied onto the pipe, allowing the winding process to be monitored on a display device. On demand, the velocities, angle and band stretch may be adjusted manually, and in the case of a problem the winding process may be stopped or reversed, and optionally be restarted.

When the end of pipe 17 is encountered (see FIG. 2b), the metal band is attached to the pipe surface, after which the band is cut.

As an alternative, two or more layers may be wound on top of each other, in such a manner that the joints of one layer do not overlap with joints of another layer. Also, the layers may be cross-wound. The purpose of having several layers is to reduce the risk of leaks due to small imperfections (holes) in the foil and/or joining.

The result of the winding process is inspected visually, and the substrate pipe having the metal membrane wound thereon is then removed from the assembly bench.

The next step of the manufacturing process is fitting the end pieces onto the pipe. To this end, a specially designed jig is used holding the pipe while the end pieces are mounted. Various devices may be used for fitting the end pieces onto the pipe and seal their connection so that undesired gases are not able to get through from one side of the membrane to the other. In this example, tubular end so pieces 4 having an inner diameter at the sealing area being somewhat larger than the outer diameter of the tubular substrate 2 with metal film 3 have been used. The end piece is thread carefully onto the substrate pipe with the metal membrane without causing damage thereto. A clamping ring 5 is pressed onto end piece 4 and squeezes the end piece against the metal membrane/substrate pipe, using the metal membrane—being flexible—as a gasket 7. To make sure that this gasket will in fact become tight, it is possible, in this region of the substrate pipe, to wind one or more additional metal membrane layers onto the substrate pipe. The result is a connection between the pipe and end pieces that will not let through undesired gases. Moreover, the end pieces are shaped so that one or more membrane elements may be installed in a housing having gas inlet and outlet channels, etc.

An alternative implementation of the end piece that has also shown to be applicable is the use of an end piece which in a heated condition (relative to the substrate) has an inner diameter that is sufficient to allow the end piece to be tread onto the substrate with membrane without damaging the membrane, and the diameter of which, when cooled to the same temperature as the substrate, shrinks and presses around the substrate with, membrane and to form a leak-proof seal and attachment for the end pieces. Also in this case the metal membrane is used as a gasket between the end piece and substrate.

The next step of the manufacturing process is welding together the overlapping side edges of the wound metal band, so that a continuous, leak-proof metal layer is formed. As such, the overlapping side edges of the metal band provide an adequate seal themselves as the metal band is stretched during the winding process and then conforms tightly to the base and irregularities because it is so thin. There is also a good adhesion between the metal bands in the overlapping zone. This, as combined with the self-diffusion properties of the metal, makes it possible to weld the joints together by placing the membrane element (substrate with wound metal band and end pieces fitted thereon) in a device in which the assembly is heated, perhaps with a given excess pressure on the membrane side. The heating cycle (time/temperature/pressure) will depend on the material selected for the metal membrane, etc.—in the present example using a palladium alloy, 300-400° C. was used. Hence, the special feature this method is that the metal foil is so thin and adheres so tautly and tightly onto the substrate to begin with that it is not necessary to use a special welding apparatus or to apply a mechanical pressure.

Figure 3A:
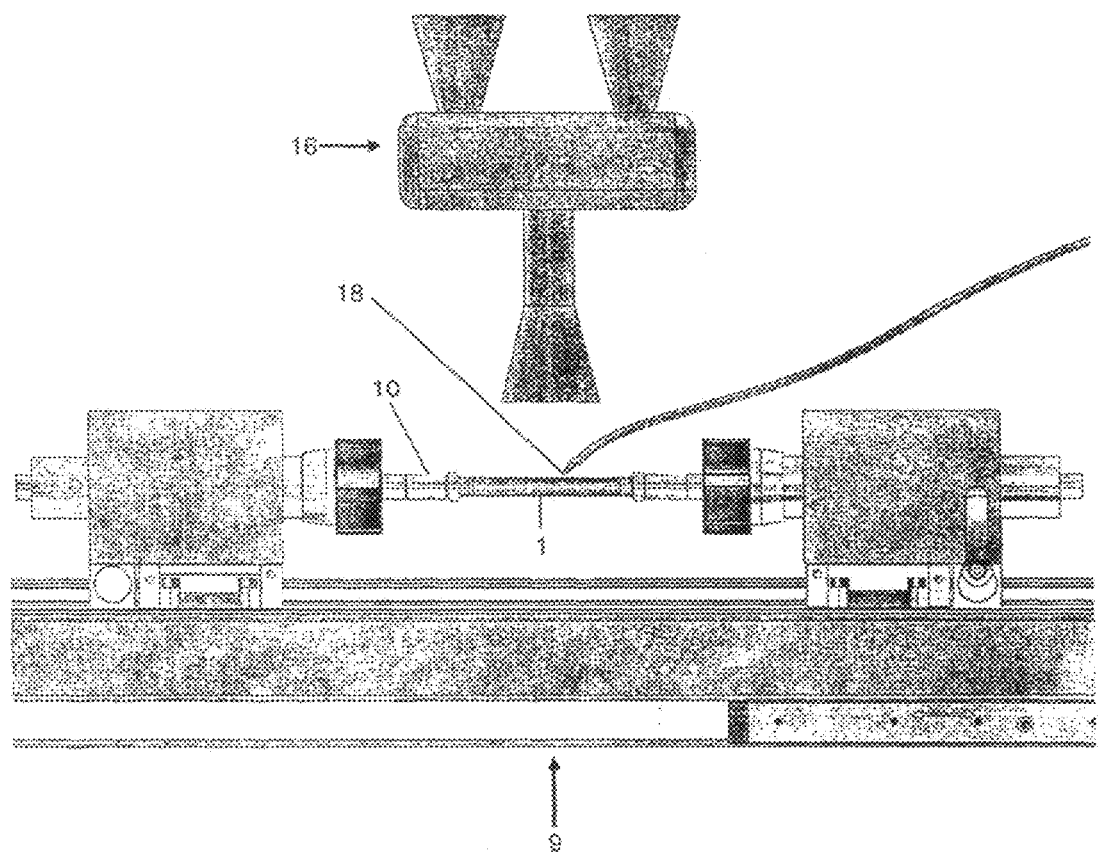
FIG. 3a shows a principle drawing of the implementation of a leakage detector apparatus.
Figure 3B:
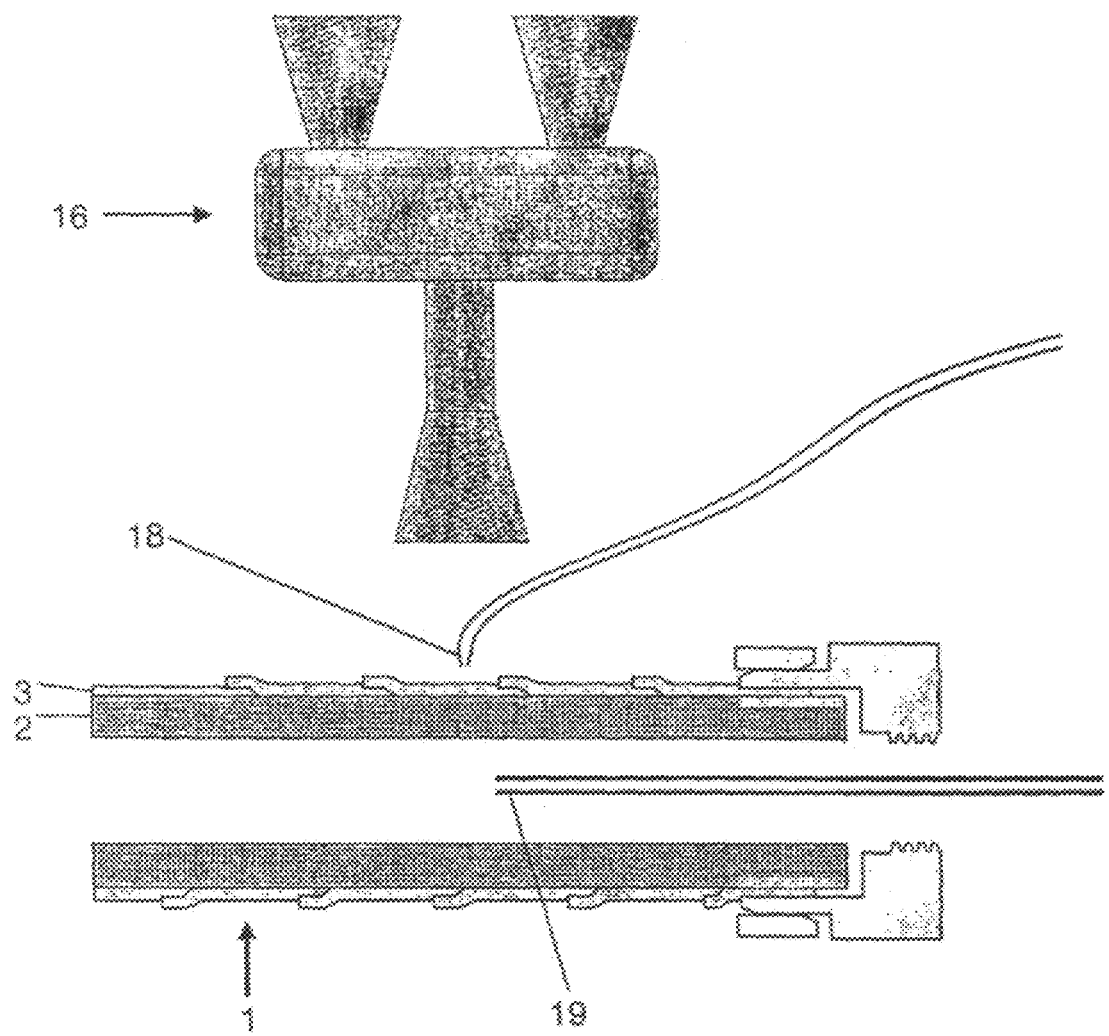
FIG. 3b shows a principle drawing of this leakage detecting method.

The last step of the manufacturing process is verifying that the membrane element is in fact tight and performing any necessary repairs. The leak detection is initiated by placing membrane element 1 in the test bench 9 (cf. FIGS. 3a and 3b). In this bench the membrane element may be moved in the axial direction thereof as well as rotated about its longitudinal axis (as in the winding process). Through a nozzle 18, helium gas or another leakage detection gas may be sprayed out towards a point on the membrane surface. Inside the pipe support a negative pressure is created by means of a pump. On the inside through the substrate pipe, a purge gas is flown. Helium gas will migrate through any holes through the membrane. A gas suction pipe 19 is positioned downstream of nozzle 18. Helium that has migrated through any hole in the membrane will be sucked up and lead to an apparatus measuring the concentration of helium or other gases, such as a mass spectrometer. The membrane assembly is then set in motion in the longitudinal direction thereof and rotated relative to the helium nozzle/suction pipe so that each point on the metal membrane is checked. If a hole exists somewhere in the membrane, helium gas will flow through that hole when the hole passes nozzle 18 and end up inside the substrate pipe, wherefrom the gas immediately will be sucked up by the gas suction pipe 19 and then be detected by the mass spectrometer. In this manner it is hence possible to check if there is a hole in the membrane and indicate the location of any holes. The test bench may be controlled both automatic and manually.

Any leaks in the membrane may be patched using different methods. In this example, we have tried out leak repair by adding a splice plate of a thin Pd-film and then performing diffusion bonding as described above. We have also used a commercial sealant material.

The membrane elements constructed and manufactured in this manner has been tested with good results in hydrogen separation. Using palladium alloy membranes having a thickness of 2.5 micrometer, a hydrogen flux of $2.5 \cdot 10^{-6}$ mbar/(m$^-$$_2$*s*Pa) was achieved with a selectivity better than 1000 at 25 bar absolute differential pressure.

EXAMPLE 2

Sheet Membrane Element, with Reference to the Following Principle Drawings

Figure 4:
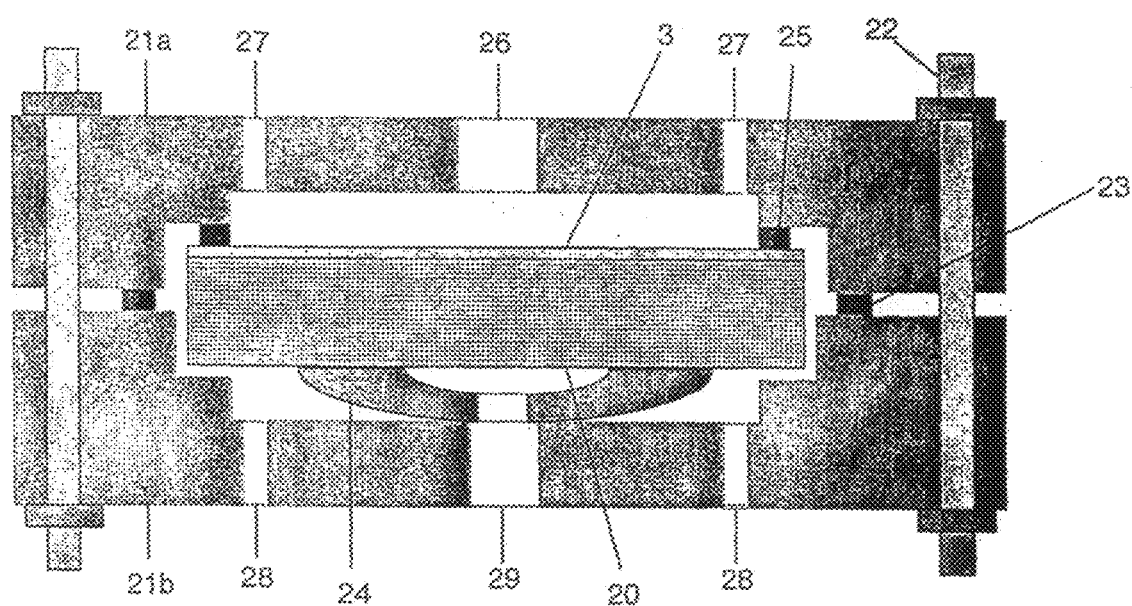
FIG. 4 shows a principle drawing of an implementation of a sheet membrane element according to the present invention. The figure shows a cross-section view of the element.

Referring to FIG. 4, in the present example a membrane element consisting of a flat, porous ceramic substrate 20 being covered with a metal foil (the membrane) 3 having a thickness of 1 micrometer and being made of a palladium alloy is shown. The substrate of this example was manufactured by pressing aluminum oxide powder in a squeezing tool to a thin disc shaped sheet, which was then sintered at 1160° C. and finally surface ground on both sides. Alternatively, ceramic substrates could be produced using various other well-known methods, e.g. by "tape casting", calendering, and suspension molding—before sintering is performed. Substrates having a layered configuration may also be produced using such well-known methods. In this example, the substrate with the membrane thereon had a circular shape, but could also have a rectangular shape, etc. Some implementations of the membrane of this example were formed as one continuous flake covering the entire substrate sheet. In other implementations, several layers were added next to each other onto the substrate with overlapping joints having been welded together by diffusion bonding.

The membrane element of this example further comprises a connection means 21, consisting of two halves, 21a and 21b, being screwed together by bolts 22. Between the two halves, a gasket 23 of a copper alloy or another suitable material is provided. The bolts 22 are tightened so that the gasket is gas tight. The substrate with the membrane thereon was held within this connection means by way of a conical-circular metal spring 24 pressing substrate 20 with membrane 3 thereon against a gasket 25 abutting against one half of the connection means. The force applied by the spring to the substrate with the membrane thereon is sufficient to make the gasket 25 gas tight. Gasket 25 may be made of a palladium alloy or another suitable material that will not cause damage to the membrane at the operating temperature. As an alternative, a gasket may be used that is composed of several materials arranged in layers, and that provides an adequate seal without causing any damage to the membrane. Such gaskets may be manufactured using several well-known methods, and must be adapted to the operating temperature, pressure, etc. of the membrane element. In the two halves of the connection means there is further provided inlets and outlets for gas entering/exiting the membrane. In the half 21a abutting the membrane, gas inlet 26 and outlet 27 pipes are provided for the portion of the gas that does not pass through the membrane. On the other half 21b, outlet pipes 28 for gas having passed through the membrane is provided. In case a purge gas is used, there is also provided inlet pipes 29 for such gas.

Figure 5:
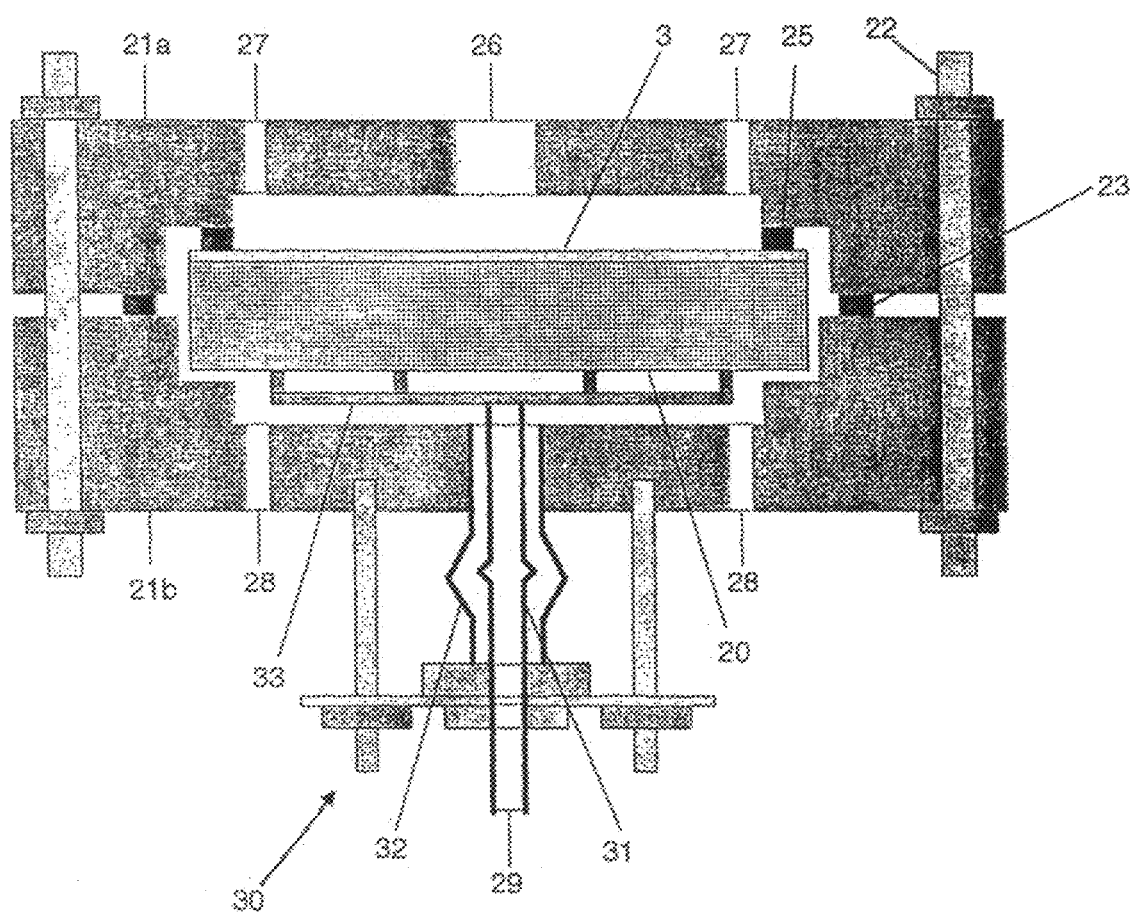
FIG. 5 shows the same as FIG. 4, using another exemplary clamping device.

As an alternative to the above, the inner metal spring 25 may be replaced by a compression means 30 (cf. FIG. 5) on the outside of the connection means. An inner pipe including a spring forming a part of the wall 31 thereof and an outer pipe including a spring forming a part the wall 32 thereof, which through a supporting means 33 press substrate 20 with membrane 3 against gaskets 25 making them gas tight.

Figure 6:
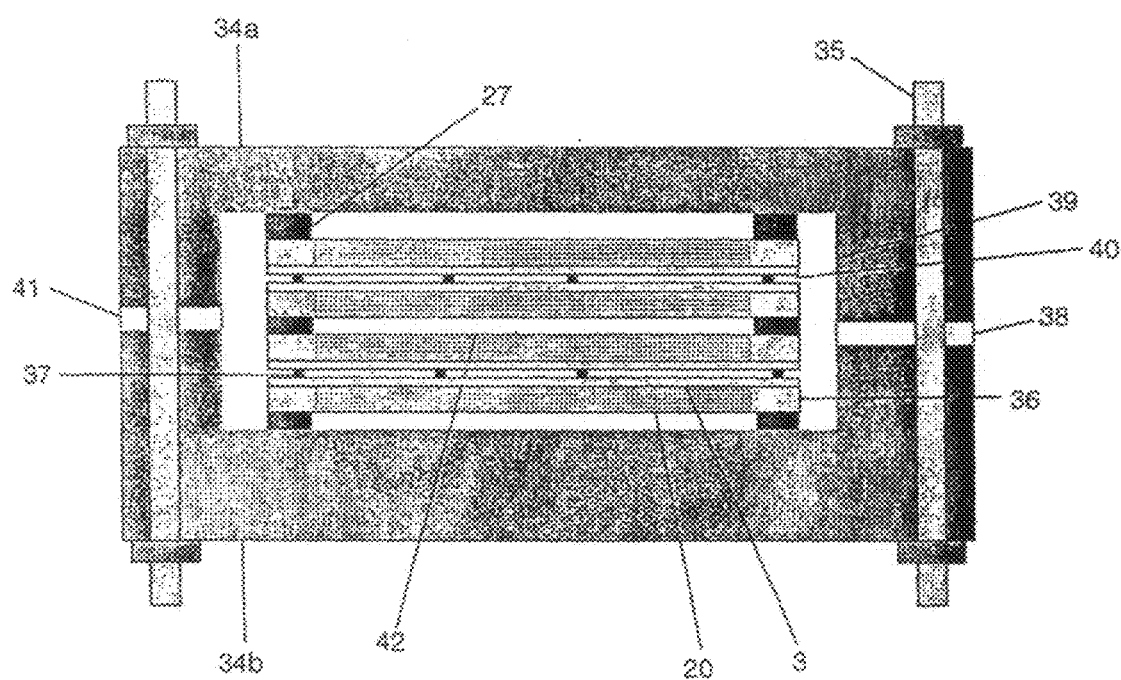
FIG. 6 shows a principle drawing of a membrane module in which several membrane elements are arranged in layers in a connection means.

Another example of a sheet membrane element is shown in FIG. 6. In this example, several rectangular, flat substrate sheets 20 with membrane 3 are stacked in layers in a connection means 34, consisting of two halves, 34a and 34b, being screwed together by bolts 35. In this example, substrates having sealed peripheral edges 36 are used. The first layer of substrate with membrane is added on the side of the substrate facing the connection means, and then the next layer is added in an opposite direction, and so on layer-wise as shown in FIG. 6. Between the stack of substrate sheets with membrane and the connection means, there is provided gas tight gaskets 25 of a type described in FIG. 4. Between each layer of substrate sheet with membrane, spacers 37 are provided that maintain the distance between the layers. The spacers may be of the same material as gaskets 25, or of another suitable material that does not react with the metal membrane 3 to destruct the latter. The connection means of the present example includes inlet pipes for feed gas 38 leading to a gas distribution area 39 distributing the gas in the interval 40 between the membranes. The gas that does not pass through the membranes exits through outlet pipe 41. The gas that does pass through the membranes exits into the interval between the substrate sheets 42 and proceeds out through outlet pipes oriented perpendicularly relative to the orientation of inlet 38 and outlet 41 for the feed gas (i.e. perpendicular to the plane of the figure, not shown in the figure). Gaskets 25 causes the feed gas to be separated from the gas having passed the membrane ("permeate gas"). If the use of a purge gas is desired, on the permeate side, such gas may be fed through a purge gas entrance on the permeate side (not shown in the figure).

EXAMPLE 3

Figure 7:
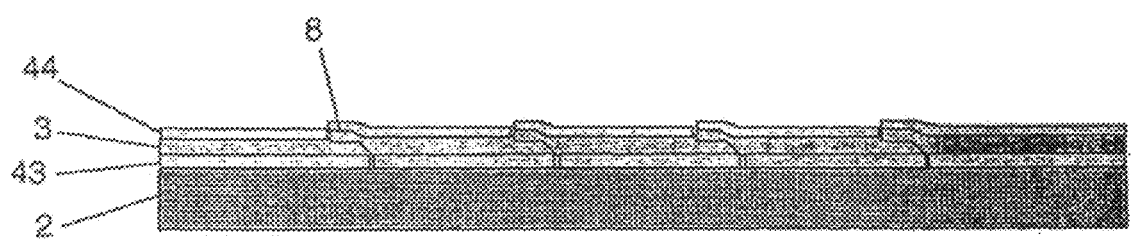
FIG. 7 shows a principle drawing of an implementation of a sheet or tubular membrane element with a membrane provided with a protective coating according to the present invention. The figure shows a cross-section view of the element.

Metal Membrane having a Protective Coating, with Reference to the Following Principle Drawing Referring to FIG. 7, in this example a metal membrane 3 having a barrier layer 43 on the side facing inwardly against substrate 2 and a protective surface layer 44 on the side facing the feed gas is shown. The purpose of barrier layer 43 is to prevent metal membrane 3 from reacting chemically with substrate 2 to degrade the membrane. Similarly, the purpose of surface layer 44 is to protect metal membrane 3 against degradation due to chemical or physical reactions with the feed gas. In the method, such layers are added onto the metal foil before the latter is wound or applied onto the substrate. As an alternative, surface layer 44 may be applied after the metal membrane has been wound or applied onto the substrate. Well-known coating methods, such as those described in the above references, for example, may then be used for coating the metal foil.

The invention claimed is:

1. A method for providing a leak-proof membrane element (1) for the selective separation or cleaning of gas of the type wherein a metal foil (membrane) (3) or such metal foil coated on one or both sides thereof with other materials (barrier/protective layers) (43, 44), and being selectively permeable for specific gases, is deposited onto a supporting stock (substrate) (2, 20) exhibiting a high gas flux and being made of metal, ceramic, polymer, or combinations thereof, and wherein connection means (4, 21, 34) are provided on the ends/edges of the substrate allowing the membrane element to be installed in a housing, characterized in that the method comprises:
   a) winding or depositing with overlapping joints (8) bands or flakes of the foil (pure metal foil or metal foil (3) partially coated with barrier/protective coatings) having a thickness of less than 10 micrometers on top of/on the outside of the substrate (2, 20),
   b) then sealing the ends/edges of the substrate by fitting connection means (4, 21, 34) onto the substrate with the membrane, using a sealant material (7, 25) between the substrate and connection means that does not let through undesired gases,
   c) then joining by diffusion bonding the overlapping joints (8) to a continuous, non porous membrane layer, by heating the substrate (2, 20) coated with the metal foil (3) while having zero or a positive overpressure on the metal side.

2. The method of claim 1, characterized in that the metal foil (3) is constituted by a lengthy band that is wound manually or in an automated arrangement, or combinations thereof, onto a tubular substrate (2).

3. The method of claim 1, characterized in that the metal foil is constituted by a lengthy band that is wound in two or more layers on top of each other, wherein such layers are wound in the same direction or in crossing directions, and wherein the joints of one layer are not co-located with those of the layer underneath or above.

4. The method of claim 1, characterized in that the metal foil is constituted by band or flakes that are deposited in two or more layers on top of each other onto a sheet substrate, wherein the joints of one layer are not co-located with those of the layer underneath or above.

5. The method of claim 1, characterized in that, first, a layer of metal foil having a barrier layer (43) on the side facing the substrate is deposited.

6. The method of claim 1, characterized in that one or more layers of a pure metal foil is/are added onto the layer comprising the barrier layer.

7. The method of claim 1, characterized in that the last metal foil layer being deposited comprises a protective layer (44) on the side facing the gas flow.

8. The method of claim 1, characterized in that an outer protective layer (44) of a suitable material is applied using a suitable, well-known coating method, after the membrane has been added onto the substrate.

9. The method of claim 1, characterized in that the membrane (3) is inspected for leaks by means of an automatic or partially automatic leakage detector that is able to indicate if any leaks exist in the membrane and to identify the location of any fault(s) in the membrane.

10. The method of claim 1, characterized in that any leaks in the membrane are patched by applying a sealant or Pd-film that is diffusion bond to the membrane.

11. A leak-proof membrane element (1) for the selective separation or cleaning of gas, wherein a metal foil (membrane) (3) is deposited onto a supporting stock (substrate) (2, 20) having connection means (4, 21, 34) on the ends/edges of the substrate allowing the membrane element to be installed in a vessel, the metal foil (3) being arranged in flakes or wound with overlapping joints (8) on the outside of the substrate (2, 20), with any joints being joined, characterized in that the metal foil (3) has a thickness of less than 10 micrometers and that the overlapping joints (8) are joined by diffusion bonding in that the metal foil (3) is heated while applying zero or a positive overpressure on the metal side.

12. The leak-proof membrane element of claim 11, characterized in that the metal foil (3) is a lengthy metal strip being wound onto the outside of a tubular substrate (2).

13. The leak-proof membrane element of claim 11, characterized in that the metal foil is wound in two or more layers one on top of the other, wherein these layers are wound in the same direction or in crossing directions, and wherein the joins of one layer are not co-located with those of the layer underneath or above.

14. The leak-proof membrane element of claim 11, characterized in that the metal foil (3) is deposited onto a sheet substrate (20).

15. The leak-proof membrane element of claim 11, characterized in that the metal foil is applied in two or more layers on top of each other, wherein the joins of one layer are not co-located with those of the layer underneath or above.

16. The leak-proof membrane element of claim 11, characterized in that the metal foil is made of palladium or a palladium alloy exhibiting a selective hydrogen diffusion.

17. The leak-proof membrane element of claim 11, characterized in that the metal foil is made of silver or a silver alloy exhibiting a selective oxygen diffusion.

18. The leak-proof membrane element of claim 11, characterized in that the metal foil (3), before being wound or deposited onto the substrate (2, 20), is fully or partially coated, on the side of the metal foil being applied against the substrate, with a thin layer (43) of a material exhibiting, in particular, a) a high gas flux for the gas that is to pass through the membrane, and b) chemical and physical properties allowing it to prevent or reduce undesired and/or promote desired chemical and physical interactions between the membrane and the substrate (barrier layer).

19. The leak-proof membrane element of claim 11, characterized in that the metal foil (3), before being wound or deposited onto the substrate (2, 20), is partially coated, on the side of the metal foil facing outwardly against the incoming gas flow, with a thin layer (44) of a material exhibiting, in particular a) a high permeability for the gas that is to pass through the membrane, and b) chemical and physical properties allowing it to prevent or reduce undesired and/or promote desired chemical and physical interactions between the membrane and the gas flow (outer protective layer).

20. The leak-proof membrane element of claim 11, characterized in that an outer protective layer (44) of a suitable material is applied using a suitable, well-known coating technique after the membrane (3) has been deposited onto the substrate (2, 20).

21. The leak-proof membrane element of claim 11, characterized in tubular connection means in the form of end pieces (4) fit at one (in the case of a pipe having a closed end) or both ends of the tubular substrate, assembled in that such end pieces have an inner diameter in the sealing area being greater than the outer diameter of the tubular substrate (2) with metal film (3), with the difference in diameters being sufficient to allow the end pieces to be tread onto the substrate with membrane without causing damage to the membrane, yet not so large that the parts of the end pieces forming the sealing area may not be pressed down onto the membrane and substrate, wherein a mechanical device (5) is used for pressing this part of the end piece against the substrate with membrane to form a leak-proof seal and attachment for the end pieces.

22. The leak-proof membrane element of claim 21, characterized in that the tubular end pieces (4), in a heated condition (relative to the substrate), have an inner diameter that is sufficient to allow the end pieces to be tread onto the substrate (2) with membrane (3) without causing damage to the membrane, and that, when cooled to the same temperature as the substrate, shrinks and presses around the substrate with membrane to provide a leak-proof seal and attachment for the end pieces.

23. The leak-proof membrane element of claim 11, characterized in that the connector means have a casing design (21) and are threaded or otherwise squeezed against the sheet substrate (20) at the edges thereof (one casing on each side of the substrate sheet) to form a leak-proof seal and attachment for the casings.

24. The leak-proof membrane element of claim 11, characterized in that one or more layers of the metal foil is/are used as sealing material (6, 25) between the substrate (2, 20) and connection means (4, 21, 34).

25. The leak-proof membrane element of claim 11, characterized in that the connection means (4, 21, 34) are made of a material having substantially the same coefficient of expansion as the substrate (2, 20).

* * * * *